United States Patent
Gueraud et al.

[11] Patent Number: 5,786,652
[45] Date of Patent: Jul. 28, 1998

[54] MAGNETOELECTRIC ROTOR WITH CLAWS AND NON-MAGNETIC SPACERS INTERPOSED THEREBETWEEN

[75] Inventors: Alain Gueraud, Seichamps; Jean-Charles Mercier, Ludres; Andre Masson, Aulnay Sous Bois, all of France

[73] Assignee: GEC Alsthom Moteurs SA, Nancy, France

[21] Appl. No.: 781,589

[22] Filed: Jan. 9, 1997

[30] Foreign Application Priority Data

Jan. 10, 1996 [FR] France ............... 96 00 211

[51] Int. Cl.⁶ .................................................. H02K 1/22
[52] U.S. Cl. ........................... 310/263; 310/49 A; 310/261
[58] Field of Search ............................. 310/49 A, 263, 310/261, 262, 265, 91, 216, 218

[56] References Cited

U.S. PATENT DOCUMENTS

| | | | |
|---|---|---|---|
| 3,215,878 | 11/1965 | Woodward et al. | 310/168 |
| 3,223,866 | 12/1965 | Tiltins | 310/263 |
| 3,230,404 | 1/1966 | Graham | 310/51 |
| 3,493,800 | 2/1970 | Barrett | 310/263 |
| 5,270,605 | 12/1993 | Lefrancois et al. | 310/263 |
| 5,483,116 | 1/1996 | Kusase et al. | 310/263 |
| 5,519,277 | 5/1996 | York et al. | 310/263 |
| 5,536,987 | 7/1996 | Hayashi et al. | 310/263 |
| 5,539,265 | 7/1996 | Harris et al. | 310/263 |

FOREIGN PATENT DOCUMENTS

| | | |
|---|---|---|
| 2087516 | 12/1971 | France . |
| 1091253 | 11/1967 | United Kingdom . |

Primary Examiner—Thomas M. Dougherty
Assistant Examiner—Tran N. Nguyen
Attorney, Agent, or Firm—Sughrue, Mion, Zinn, Macpeak & Seas, PLLC

[57] ABSTRACT

The invention relates to a 2N pole claw rotor comprising a first magnetic material part, comprising an axial hub having a free end, and an end provided with N axially-extending claws that are peripherally localized, uniformly distributed, and together define a bezel; a second magnetic material part of polarity opposite to the polarity of the first magnetic material part, having the same shape as the first magnetic material part, and disposed facing the first magnetic material part, each claw of the second magnetic material part being disposed between two claws of the first magnetic material part, and vice versa; non-magnetic spacers interposed between the free ends of the claws and the end walls of the bezels of the facing parts; and non-magnetic rotor-cowling means.

4 Claims, 3 Drawing Sheets

MAGNETOELECTRIC ROTOR WITH CLAWS AND NON-MAGNETIC SPACERS INTERPOSED THEREBETWEEN

The invention relates to a magnetoelectric rotor with claws, and more particularly to a magnetoelectric rotor with claws designed to be used in a fast synchronous machine.

BACKGROUND OF THE INVENTION

Rotors with claws are constituted by a plurality of non-magnetic elements and polarized magnetic elements that are assembled together. The speeds that can be involved in certain fast synchronous machines can be equal to or greater than 50,000 rpm. As mentioned above, such rotors comprise assemblies of parts, and as a result manufacturers of claw rotors seek to obtain rotors providing the highest possible resistance to centrifugal bursting while still retaining and optimal aerodynamic profile.

Solid rotors exist. Their large mass limits their speed of rotation. In rotation, the centrifugal force developed is proportional to moving mass. With a solid type of rotor, it is necessary to use assembly techniques of the isostatic compression type or of an equivalent type to ensure that the rotor can withstand bursting at high operating speeds. Such assembly techniques are expensive and difficult to use in the context of mass production. Also, in a solid rotor of this type, the component parts are complicated in shape and they are not easy to put together.

OBJECTS AND SUMMARY OF THE INVENTION

The objects of the present invention are to propose a compact claw rotor that is simple in structure, and to do so by techniques that are common, the rotor being capable of rotating at high speeds of rotation, and having manufacturing costs that are compatible with mass production.

To this end, the invention provides a claw rotor having 2N poles (N being an integer) and comprising:
- a first magnetic material part, comprising an axial hub having a free end, and an end provided with N axially-extending claws that are peripherally localized, uniformly distributed, and together define a bezel;
- a second magnetic material part of polarity opposite to the polarity of the first magnetic material part, having the same shape as the first magnetic material part, and disposed facing the first magnetic material part, each claw of the second magnetic material part being disposed between two claws of the first magnetic material part, and vice versa;
- non-magnetic spacers interposed between the free ends of the claws and the end walls of the bezels of the facing parts; and
- non-magnetic rotor-cowling means.

Advantageously, each claw has an outer longitudinal face with progressive radial magnetic air gap zones.

Each claw of a magnetic part has flaring inside faces with a point of convergence located close to the center of the bezel.

Each claw includes a polygonal base in contact with the axial hub, and a tapering free end.

The rotor includes at least one one-piece nonmagnetic multi-spacer part serving as a spacer for a plurality of claws.

In an embodiment, the rotor includes non-magnetic double spacers providing direct rigid links between diametrically-opposite claws.

A first advantage of the rotor of the invention results from the central recess of the rotor due to the bezels of the magnetic parts. That has the effect of lightening the rotor and thus for equivalent speed of developing centrifugal stress that is less than that which would be developed with a solid rotor.

A second advantage results from the above advantage: since the centrifugal stresses involved are smaller, the various component elements of the rotor can be assembled together by bonding techniques that are more conventional and cheaper.

Another advantage results from the special shape of the claws which serve firstly to limit flux leakage and secondly to limit the centrifugal bending stresses of the claws in rotation.

BRIEF DESCRIPTION OF THE DRAWINGS

Other advantages and characteristics of the present invention appear from the following description given with reference to the accompanying drawings, in which.

MORE DETAILED DESCRIPTION

Figure 1:
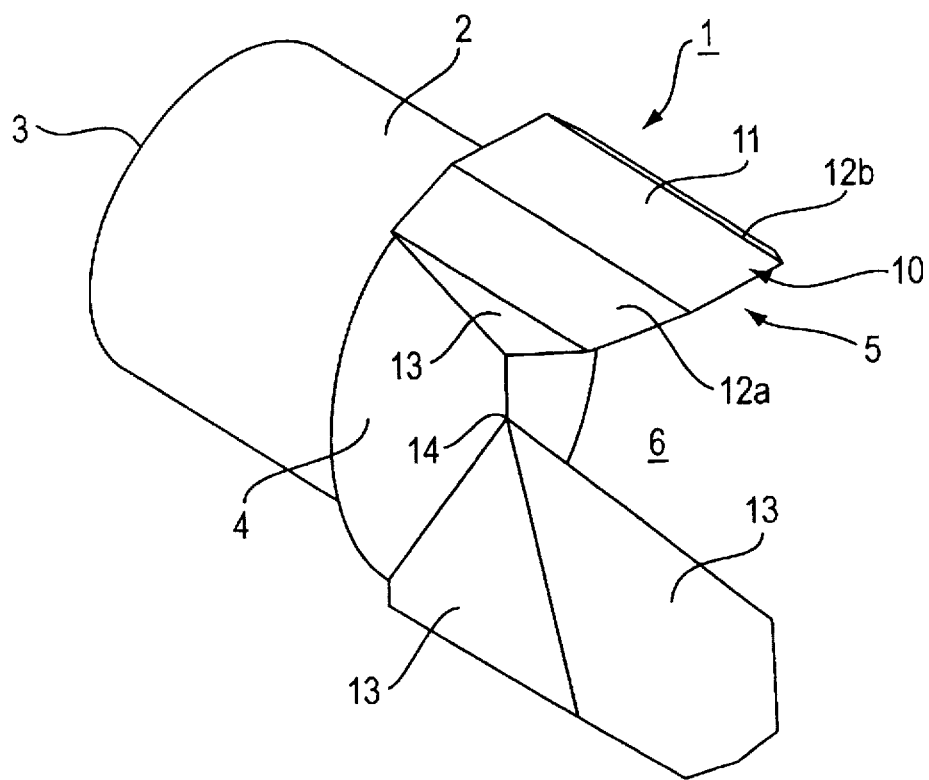
FIG. 1 is a diagrammatic perspective view of a two-pole magnetic part for a four-pole rotor of the invention.

The rotor of the invention is designed to be as light as possible and easy to build.

The search for lightness has led to replacing as much non-magnetic material as possible with air. The solution proposed by the invention is a rotor that is hollow or that includes hollows, having one magnetic air gap per zone that is radially progressive and an aerodynamic mechanical air gap that is constant and smooth.

The search for ease of building has led to restricting the number of component parts of the rotor.

The 2N pole claw rotor of the invention comprises:
- a first magnetic material part 1, comprising an axial hub 2 having a free end 3, and an end 4 provided with N axially-extending claws 5 that are peripherally localized, uniformly distributed, and together define a bezel 6;
- a second magnetic material part 1' of polarity opposite to the polarity of the first magnetic material part, having the same shape as the first magnetic material part 1, and disposed facing the first magnetic material part 1, each claw 5' of the second magnetic material part 1' being disposed between two claws 5 of the first magnetic material part 1, and vice versa;
- non-magnetic spacers 7 interposed between the free ends 8 of the claws 5, 5' and the end walls of the bezels 6', 6 of the facing parts 1', 1; and
- non-magnetic rotor-cowling means 9.

In the embodiment of the invention shown in the figures, N is equal to 2. Thus, the end 4 of the hub 2 has two diametrically-opposite claws 5, and the same applies to the end 4' of the hub 2' and the two claws 5'.

Each claw 5 or 5' has an outer longitudinal face 10 with progressive radial magnetic air gap zones.

In the embodiment of the invention shown in the figures, the outer longitudinal face 10 comprises a central zone 11 whose radius is equal to the outside radius of the rotor with its cowling 9 removed, and two chamfered lateral zones 12a and 12b on either side of the central zone 11. The chamfered shapes form radial progressive magnetic air gaps.

The resulting general shape of the outer longitudinal face 10 serves to optimize the passage of magnetic flux between the central zone 11 and the stator of the rotary machine.

The claws of the invention advantageously have inner faces 13 converging on points 14 located close to the center of the bezel 6.

The purpose of this characteristic is to leave a large non-magnetic space between two adjacent magnetic masses of opposite polarities (adjacent claws). This non-magnetic space serves to limit magnetic flux leakage passing directly between two adjacent poles of opposite polarities, instead of passing via the stator.

In the embodiment shown in the figures, the claws also include faces that are organized so as to possess a large base in contact with the axial hub so as to take up the bending stresses of the claws under the action of centrifugal force, and tapered free ends to limit the moving mass at the ends of the claws, thereby attenuating said bending stresses at the base.

The non-magnetic spacers 7 interposed between the free ends 8, 8' of the claws 5, 5' of each of the magnetic parts 1, 1' and the facing end walls of the bezels 6', 6 of the parts 1', 1 have the purpose of creating sufficient non-magnetic space between the polarized claws of one of the magnetic parts and the end wall of the bezel of the other magnetic part of opposite polarity to minimize magnetic flux losses between the claws and the opposite part.

These non-magnetic spacers 7 also have a mechanical role of providing axial and radial cohesion to the rotor. This is achieved by each spacer providing a rigid mechanical link between the ends of the claws of one of the magnetic parts and the end wall of the bezel of the other magnetic part.

In the embodiment shown in the figures, double nonmagnetic spacers are used which serve not only to provide the rigid links between the ends of the claws of one of the magnetic parts and the end wall of the bezel of the other magnetic part, but also to provide a rigid direct link between the diametrically opposite claws. This contributes to improving the radial cohesion of the rotor.

Figure 2:
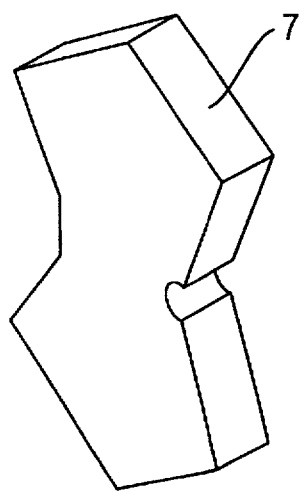
FIG. 2 is a diagrammatic perspective view of a non-magnetic two-spacer component part of a four-pole rotor of the invention.
Figure 3:
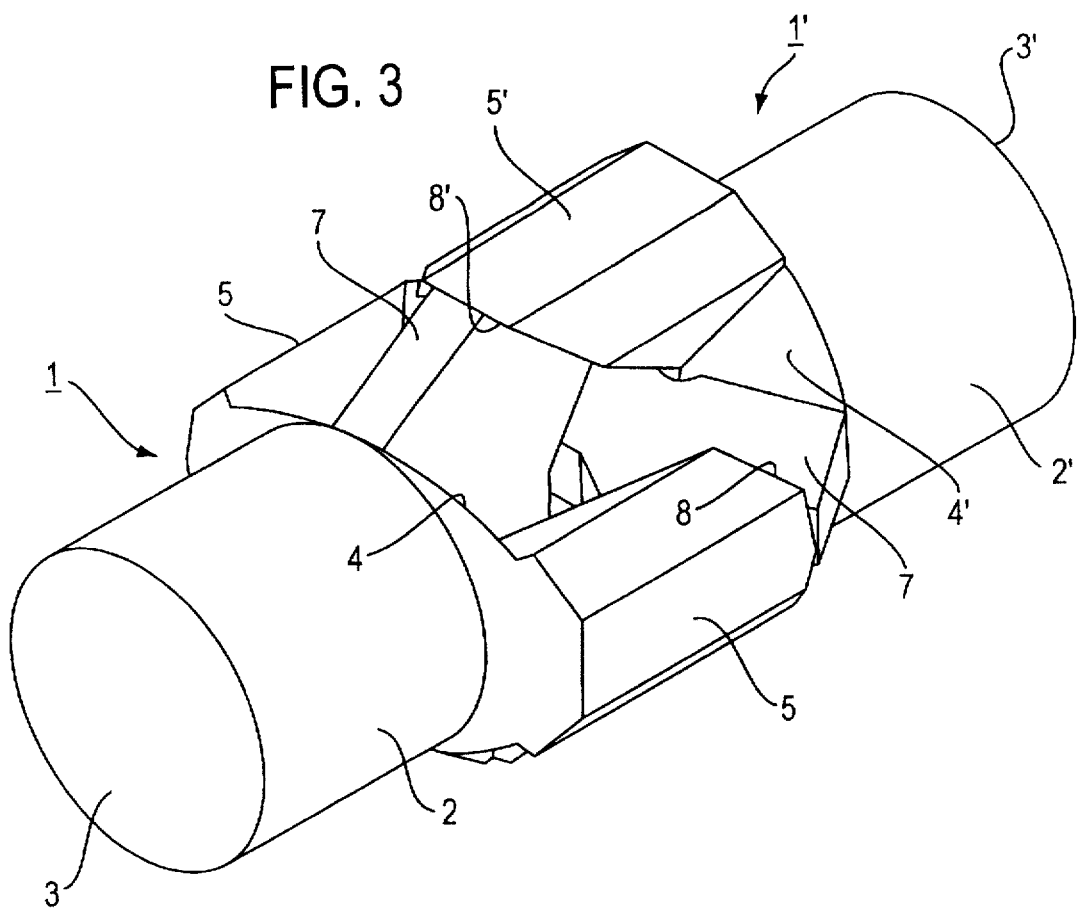
FIG. 3 is a diagrammatic perspective view of a four-pole rotor of the invention with its cowling means removed.
Figure 4A:
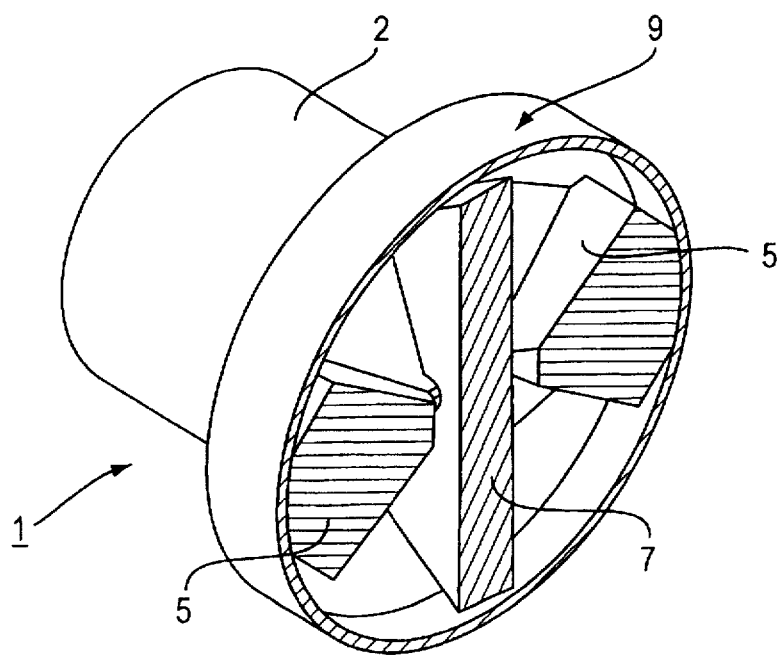
FIGS. 4A, 4B, and 4C are diagrammatic perspective views showing cross-sections of a four-pole rotor of the invention.
Figure 4B:
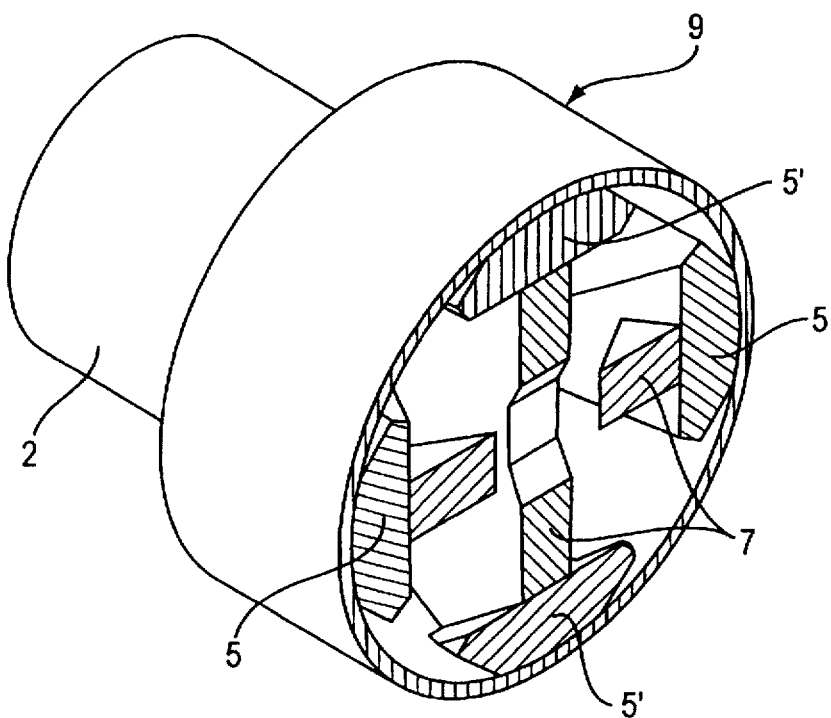
Figure 4C:
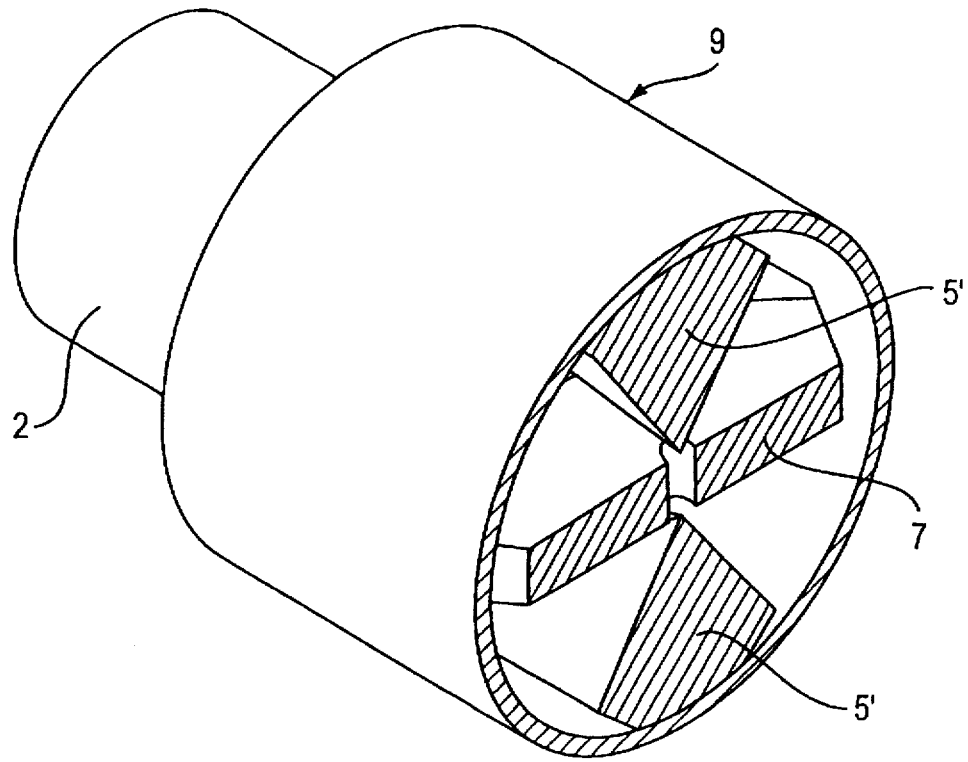

FIG. 2 shows a one-piece double spacer of the invention.

Another characteristic of the one-piece double spacer is having a shape that is balanced both statically and dynamically about the axis of rotation of the rotor.

Thus, when in rotation, centrifugal forces cancel in each one-piece double spacer. The fact that the spacer is made as a single piece provides additional safety.

In another embodiment (not shown), the spacer function is provided by a single one-piece part for all of the claws.

The spacers or multi-spacers are designed to perform the non-magnetic and mechanical functions required of them while using a minimum amount of material.

The spacers can be secured to the claws and/or the end walls of the bezels by any known means, e.g. of the welding, screwing, or adhesive type. In the invention, the mechanical characteristics required for such connection are considerably less than for a solid rotor.

In order to give the rotor an optimal aerodynamic profile, the claws are cowled by non-magnetic cowling means.

Because of the special structure of the rotor, the cowling need not constitute an element providing axial or radial cohesion to the rotor, so it can be made of any non-magnetic material and its thickness need only withstand its own inertia.

In the embodiment shown in the figures, the cowling means comprise a hollow cylinder covering the claws and two annular endpieces surrounding the hubs and closing the bases of the cylinder.

Naturally, the invention is not limited to the embodiment described and shown, but can be varied in numerous ways by the person skilled in the art without going beyond the invention. In particular, without going beyond the ambit of the invention, it is possible to increase the number of poles of the rotor.

We claim:

1. A claw rotor comprising:

a first magnetic material part, comprising an axial hub having a free end, and an end provided with a plurality of axially-extending claws that are peripherally localized, uniformly distributed, and together define a hollow bezel-shaped central recess and wherein each claw has inside faces extending radially inwardly and forming a point of convergence located close to the center of the bezel-shaped central recess;

a second magnetic material part of polarity opposite to the polarity of the first magnetic material part, having the same shape as the first magnetic material part, and disposed facing the first magnetic material part, each claw of the second magnetic material part being disposed between two claws of the first magnetic material part, and vice versa;

non-magnetic spacers interposed between free ends of the claws and end walls of the claws which define the bezel-shaped central recess; and non-magnetic rotor-cowling means shrouding said claws.

2. A rotor according to claim 1, wherein each claw has an outer longitudinal face with progressive radial magnetic air gap zones.

3. A rotor according to claim 1, wherein each claw includes a polygonal base in contact with the axial hub, and a tapering free end.

4. A rotor according to claim 1, including non-magnetic double spacers providing direct rigid links between diametrically-opposite claws.

* * * * *